Dec. 29, 1931.   A. CALLENDER   1,838,986
BAG CARRYING CANE
Filed Aug. 21, 1929
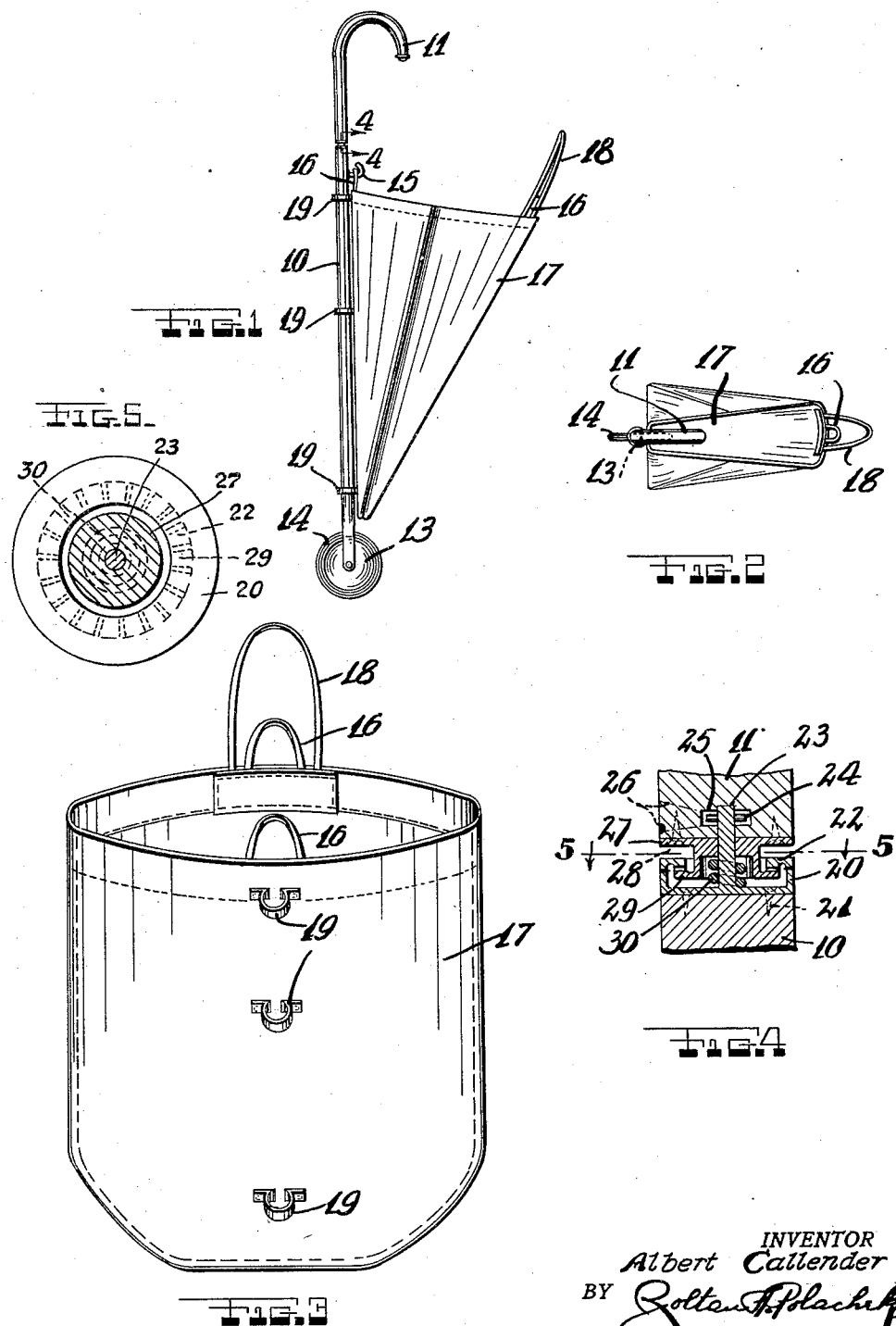

Patented Dec. 29, 1931

1,838,986

UNITED STATES PATENT OFFICE

ALBERT CALLENDER, OF BROOKLYN, NEW YORK

BAG-CARRYING CANE

Application filed August 21, 1929. Serial No. 387,275.

This invention relates to new and useful improvements in canes to which load-carrying bags may be attached.

The invention has for an object the provision of a device of the class mentioned which is of simple durable construction, dependable in use and efficient in action, and which can be manufactured and sold at a reasonable cost.

The invention proposes a cane with a bottom wheel for riding on the ground, and a bag supported upon the shank of the cane. The bag should be open at the top and associated with a closing means. Preferably the bag should be of the customary shopping type.

Women attending the market for shopping very often carry heavy loads in the so-called shopping bags and strain or rupture themselves. The arrangement of the cane for supporting the bag transfers the load to the ground instead of upon the person doing the shopping. In addition, the transfer of load to the ground eliminates tiring and other discomforts. It is proposed that the bag be slidably mounted upon the cane and arranged for assuming a fixed position, and to be detachable so as to be exchangeable for a different bag. Loop-forming straps are used for providing this arrangement.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a side elevational view of a device constructed according to this invention.

Fig. 2 is a plan view of Fig. 1.

Fig. 3 is a perspective view of the bag, per se.

Fig. 4 is a fragmentary enlarged vertical sectional view taken on the line 4—4 of Fig. 1.

Fig. 5 is a horizontal sectional view taken on the line 5—5 of Fig. 4.

The reference numeral 10 indicates generally the shank of a cane having a handle 11. As shown on the drawings, the handle is curved but other types of handle may be used instead. A wheel 13 is rotatively supported upon the bottom of the shank preferably with ball bearings and may be provided with a rubber tire 14.

A support screw 15 projects from the shank of the cane near the handle portion and normally engages one of the handles 16 which project from the top edge of a shopping bag 17. This shopping bag is open at the top and the handles 16 are diametrically arranged. A third handle 18 much larger than the handle 16 extends over the handle 16 remote from the set screw 15. This large handle 18 is also attached upon the top of the bag.

The bag 17 extends substantially the full length of the shank and along its vertical height has several loop-forming straps 19 secured upon one side in a vertical row. These straps are positioned beneath the handle 16 which engages the support screw 15. The loop-forming straps slidably engage upon the shank of the cane as shown in Fig. 1. The bag may be disengaged by merely slipping it upwards and along the cane until each of the loop straps disengage from the handle 11.

The shank 10 and handle 11 consist of separate sections. A circular bracket 20 is attached upon the top of the shank 10 by screws 21 and is formed with overhanging bitted serrations 22. A vertical post 23 projects from the center of the bracket 20 and rotatively supports the handle 11. The rotative connection is accomplished with a transverse pin 24 engaged thru the post and arranged in a groove 25 formed in the handle. Dot and dash lines 26 indicate a filled hole in the handle thru which the pin was passed when it was inserted into the vertical post.

A second circular bracket 27 is attached upon the bottom of the handle 11 by screws 28 and is formed with depending bitted serrations 29 interengaging with the serrations 22. A spring 30 is coaxially mounted upon the post 23 and urges the brackets apart so that the serrations interengage. The handle 11 may be pressed downwards for slightly compressing the spring 30 and disengaging the bitted serrations 22, 29. Then it may be rotated to a different angular position relative to the plane of the wheel 13. The user may determine the position of the handle best suited for her comfort. The member 20 is formed from upper and lower sections brazed or otherwise fastened together so that the member 27 may be assembled therewith.

In operation of the device the bag is engaged upon the shank of the cane as shown in Fig. 1. The disengaged handle 16 may also be engaged upon the support screw 15 when the bag is empty or partially filled. After excessive shopping and the bag is fully loaded, this handle 16 cannot be engaged upon the support screw 15. Then the large handle 18 may be held in one hand and the same hand rested upon the handle 11 for guiding the device. The load of the bag should be upon the support screw 15 and thus transferred to the ground.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a device of the class described, a wheel for traveling along the ground, a cane radially supported on and perpendicular with the axis of said wheel, a bracket attached on the cane formed with the circular radial internal flange having serrations on its bottom, another bracket formed at one end with a circular radial external flange having serrations to fit on the first mentioned bracket, a cane handle attached to the other end of the latter bracket, a vertical post projecting from the center of the first bracket into said handle, a transverse pin engaged thru the post and arranged in a groove in the handle for rotatively supporting said handle, and a spring between the brackets urging them apart so that the serrations interengage permitting the handle to be latched in various positions relative to the direction of rolling of said wheel.

2. In a device of the class described, a wheel for traveling along the ground, a cane radially supported on and perpendicular with the axis of said wheel, a bracket attached on the cane formed with a circular radial internal flange having serrations on its bottom, another bracket formed at one end with a circular radial external flange having serrations at the top and coaxially interengageable with the serrations on the first mentioned bracket, a cane handle attached to the other end of the latter bracket, means for rotatively supporting said handle, and a spring between the brackets urging them apart so that the serrations interengage permitting the handle to be latched in various positions relative to the direction of rolling of said wheel.

In testimony I have affixed my signature.

ALBERT CALLENDER.